United States Patent
Houle et al.

(10) Patent No.: US 8,913,605 B2
(45) Date of Patent: Dec. 16, 2014

(54) TELEPHONE FEATURE SELECTION BASED ON FEATURES RECEIVED FROM A SERVICE PROVIDER

(75) Inventors: Dennis Joseph Houle, Plano, TX (US); Loyd Gene Collier, III, Desoto, TX (US); William Michael Kewin, Rowlett, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1455 days.

(21) Appl. No.: 12/021,678

(22) Filed: Jan. 29, 2008

(65) Prior Publication Data

US 2009/0190574 A1 Jul. 30, 2009

(51) Int. Cl.
*H04L 12/66* (2006.01)
*H04M 3/42* (2006.01)
*H04L 29/06* (2006.01)
*H04M 7/00* (2006.01)

(52) U.S. Cl.
CPC ... *H04L 65/1096* (2013.01); *H04M 2203/6081* (2013.01); *H04M 2201/38* (2013.01); *H04M 2201/42* (2013.01); *H04M 7/006* (2013.01); *H04M 3/42153* (2013.01); *H04M 2203/053* (2013.01); *H04M 2203/254* (2013.01); *H04L 65/1006* (2013.01)

USPC ........... 370/352; 370/353; 370/354; 370/355; 370/356; 370/260

(58) Field of Classification Search
CPC ............ H04M 3/42153; H04M 7/006; H04M 2201/38; H04M 2201/43; H04M 2203/053; H04M 2203/254; H04M 2203/6081; H04L 65/1006; H04L 65/1096
USPC ......................................... 370/260, 352–356
See application file for complete search history.

(56) References Cited

U.S. PATENT DOCUMENTS

| 6,490,564 | B1 * | 12/2002 | Dodrill et al. ................. 704/275 |
| 2003/0108184 | A1 * | 6/2003 | Brown et al. ............ 379/265.09 |
| 2005/0195957 | A1 * | 9/2005 | Gibson .................... 379/211.02 |
| 2006/0274678 | A1 * | 12/2006 | Holloway et al. ............. 370/260 |
| 2007/0203799 | A1 * | 8/2007 | Caballero et al. ............... 705/26 |
| 2007/0217580 | A1 * | 9/2007 | Goose et al. ............. 379/88.06 |
| 2007/0242810 | A1 * | 10/2007 | Gilleland ................... 379/88.21 |

* cited by examiner

*Primary Examiner* — Khaled Kassim (57) ABSTRACT

Implementations described herein may provide for VoIP phone or server devices, where the phones include visual menus through which a user of the phone can modify options or features relating to the user's account. In one implementation, the phone may receive a data structure defining features relating to communication services for the phone device. The phone may parse the data structure to obtain a menu corresponding to the features and present the menu to a user of the phone device.

23 Claims, 9 Drawing Sheets

```
<?xml version ="1.0" encoding = "UTF-8"?>

<feature name ="3-way calling">
  <radiobutton>off</radiobutton>
</feature>

<feature name ="call forwarding">
  <radiobutton>off</radiobutton>
  <inputtextbox name ="enter number">" "</inputtextbox>
</feature>
```

TELEPHONE FEATURE SELECTION BASED ON FEATURES RECEIVED FROM A SERVICE PROVIDER

BACKGROUND INFORMATION

The public switched telephone network (PSTN) was originally a network of public circuit-switched telephone links. More recently, packet-based networks, such as Internet Protocol (IP) networks, are being used as alternatives to conventional PSTN networks. Voice over IP (VoIP), for example, is commonly used to transmit voice over IP networks.

One protocol frequently used with VoIP calls is the so-called Session Initiation Protocol (SIP). SIP is an application-layer control (signaling) protocol for creating, modifying, and terminating sessions with one or more participants. It can be used to create two-party, multiparty, or multicast calls.

Typically, users of a telephone system, such as a VoIP system, subscribe to telephone services that have a number of user-configurable options. For example, a service may allow subscribers to turn call-forwarding on or off or use distinctive ring sounds for long distance calls. One way to allow users to modify such features is through "star codes." With star codes, a user may dial predetermined codes, typically beginning with a preselected character (e.g., a "*"), to modify features. For example, a user may dial "*70" to disable call waiting.

In operation, star codes may be transmitted by the phone to a switching facility used in the telephone infrastructure (e.g., central office or SIP proxy server). The switching facility intercepts the star code and updates the appropriate feature of the user's account.

One problem with star codes is that it can be difficult for the average user to remember all of the codes. Some providers give users the ability to configure their account features through a separate web interface. This option, however, requires that the user have a web browser available.

DETAILED DESCRIPTION OF PREFERRED EMBODIMENTS

The following detailed description refers to the accompanying drawings. The same reference numbers in different drawings may identify the same or similar elements. Also, the following description does not limit the invention.

Implementations described herein may provide for VoIP phones that include visual menus through which a user of the phone can modify options or features relating to the user's account. The features may include, for example, call waiting, call forwarding, or other features. The selections available in such a feature menu may be generated based on information received by the phone from the service provider. In this manner, the service provider can dynamically update or modify the feature menu available for an account at the particular phone device.

Figure 1:
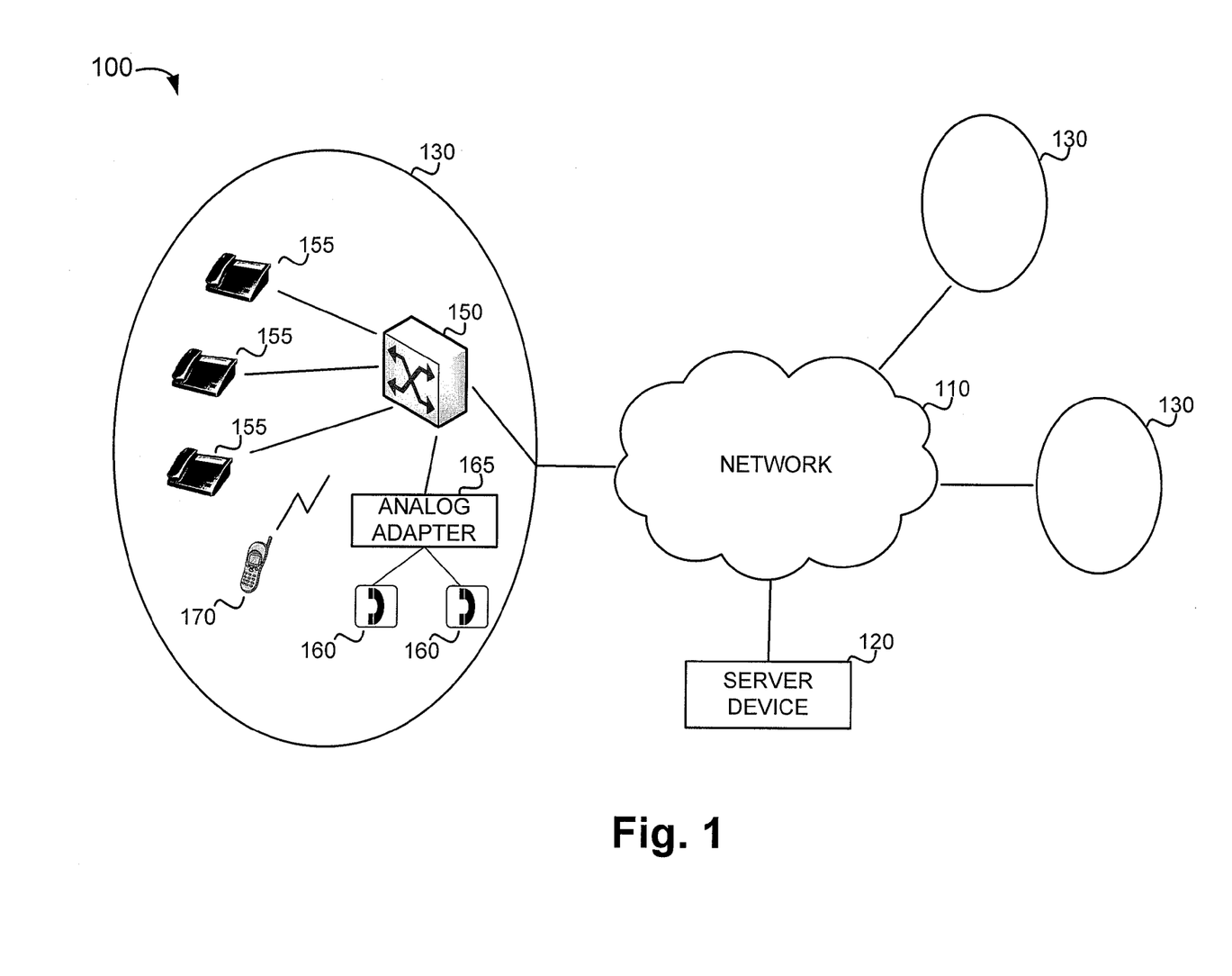
FIG. 1 is a diagram that illustrates an exemplary system described herein.

FIG. 1 is a diagram that illustrates an exemplary system 100. As shown, system 100 includes a network 110. A number of devices and/or sub-networks may be connected to network 110, such as server device 120 and local area networks (LANs) 130.

Network 110 may include one or more networks of any type, including a Public Land Mobile Network (PLMN), a Public Switched Telephone Network (PSTN), a local area network (LAN), a metropolitan area network (MAN), a wide area network (WAN), a private network, the Internet, an intranet, and/or another type of network. In one particular implementation, network 110 may include a packet-based IP network, such as the Internet, and may be used for, among other things, VoIP communications. The VoIP communications may be provided by a voice service provider, such as a telecommunications company. The voice service provider may provide end-to-end VoIP services by itself or in collaboration with other entities, such as another telecommunications entity, a phone vendor, or a proxy server vendor.

Server device 120 may include a server entity. An entity may be defined as a device, such as a computer or another type of computation or communication device, a thread or process running on one of these devices, and/or an object executable by one of these devices. Server device 120 may generally provide services to other devices connected to network 110. In one embodiment, server device 120 may include a session initiation protocol (SIP) proxy server that assists terminal devices, such as SIP user agents (e.g., VoIP phones) in one or more of LANs 130, in signaling and call setup operations for IP-based communications, such as VoIP calls.

LANs 130 may each include a number of networked devices. A local area network may be, for example, a network implemented by a corporation or other entity. Exemplary devices are particularly shown for one of the LANs 130 shown in FIG. 1. This network is shown as including a switch (or router) 150 that connects LAN 130 to network 110. A number of devices may be connected to switch 150, including wired VoIP phone devices 155, wireless VoIP phone device 170, and analog (conventional) phone devices 160. An adapter 165 may be used to allow conventional phone devices 160 to communicate as VoIP devices. Adapter 165 may generally provide an interface that converts between the analog signals used by analog phone devices 160 and the digital signals used in VoIP communications.

VoIP phones 155 may be stand-alone phone devices capable of initiating VoIP calls over network 110. Alternatively, VoIP phones may be "soft-phones" that are implemented as software on a personal computer or other multi-function or general purpose computing device.

LANs 130 may also include wireless VoIP phones, such as phone 170. Wireless VoIP phone 170 may connect wirelessly to network 110, such as through switch 150. In some implementations, wireless VoIP phones 170 may connect directly to network 110. Accordingly, wireless VoIP phones 170 may be used outside of LAN 130.

Phone devices 160 may include conventional analog phone devices that plug into adapter 165.

Figure 2:
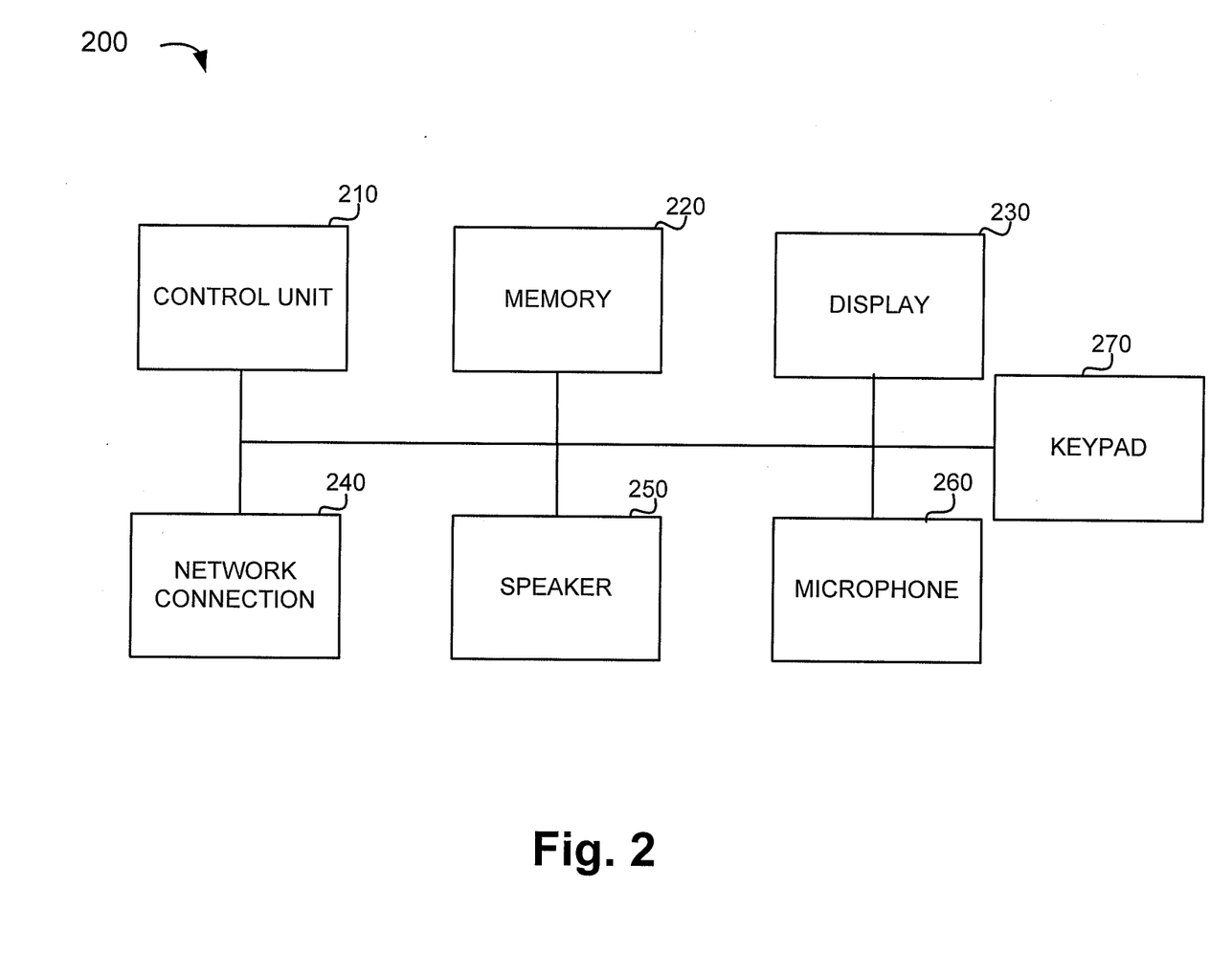
FIG. 2 is a diagram illustrating exemplary components of certain of the phone devices shown in FIG. 1.

FIG. 2 is a diagram illustrating exemplary components of VoIP phone device 155 or VoIP phone device 170, referred to as phone device 200 herein. Phone device 200 may include a control unit 210, a memory 220, a display 230, a network connection 240, a speaker 250, a microphone 260, and a keypad 270.

Control unit 210 may include a processor, microprocessor, or other types of processing logic that may interpret and execute instructions. Memory 220 may include a dynamic or static storage device that may store information and instructions for execution by control unit 210. For example, memory 220 may include a storing component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Display 230 may include any component capable of providing visual information. For example, in one implementation, display 230 may be a liquid crystal display (LCD). In another implementation, display 230 may be any one of other display technologies, such as a plasma display panel (PDP), a field emission display (FED), a thin film transistor (TFT) display, etc. Display 230 may display, for example, text, image, and/or video information.

Network connection 240 may include any transceiver-like mechanism that enables phone device 200 to communicate with other devices and/or systems. For example, network connection 240 may include an Ethernet interface, an optical interface, a coaxial interface, a radio interface, or the like. Network connection 240 may allow for wired, wireless, and/or optical communication. Network connection 240 may be particularly configured to connect phone device 200 to a packet-based IP network, such as network 110. In some implementations, network connection 240 may access network 110 via an Ethernet connection with switch 150. In other implementations, network connection 240 may access network 110 via a wireless connection.

Speaker 250 may be a speaker through which phone device 200 can provide audible output to a user. Control unit 210 may, for example, use speaker 250 to provide voice transmissions to the user. Microphone 260 may include any component capable of transducing air pressure waves to a corresponding electrical signal. For example, a user may speak into microphone 260 during a telephone call.

Keypad 270 may include any component capable of providing input to phone device 200. Keypad 270 may include a standard telephone keypad. Keypad 270 may also include one or more special purpose keys. In one implementation, each key of keypad 270 may be, for example, a pushbutton. A user may utilize keypad 270 for entering information, such as text or a phone number.

Figure 3:
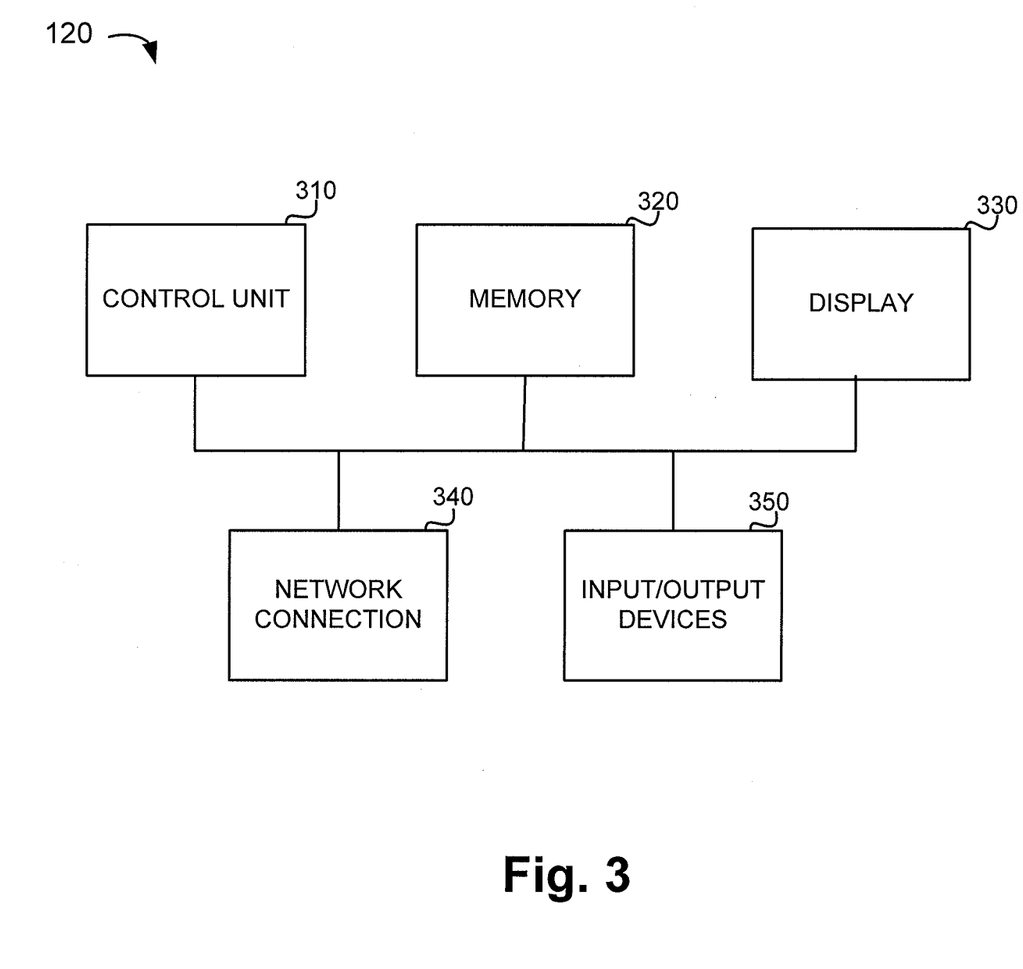
FIG. 3 is a diagram illustrating exemplary components of the server device shown in FIG. 1.

FIG. 3 is a diagram illustrating exemplary components of server device 120. Server device 120 may include a control unit 310, a memory 320, a display 330, a network connection 340, and input/output devices 350.

Control unit 310, memory 320, display 330, and network connection 340 may be implemented similarly to the like-named components shown in FIG. 2 (i.e., control unit 210, memory 220, display 230, and network connection 240). Accordingly, these elements will not be discussed further herein.

Input/output devices 350 may generally include user input devices such as a keyboard or mouse and output devices such as a display or printer. With input/output devices 350, a user may generally interact with server device 120. In some implementations, server device 120 may be a "headless" server, in which case input/output devices 350 may be absent.

As will be described in detail below, devices 200/120 may perform certain operations relating to communications over a network. Devices 200/120 may perform these operations in response to control unit 210/310 executing software instructions contained in a computer-readable medium, such as memory 220/320. A computer-readable medium may be defined as a physical or logical memory device.

The software instructions may be read into memory 220/320 from another computer-readable medium or from another device via network connection 240/340. The software instructions contained in memory 220/320 may cause control unit 210/310 to perform processes that will be described later. Alternatively, hardwired circuitry may be used in place of or in combination with software instructions to implement processes described herein. Thus, implementations described herein are not limited to any specific combination of hardware circuitry and software.

Although FIGS. 2 and 3 illustrate exemplary components of phone device 200 and server device 120, in other implementations, devices 200/120 may include fewer, additional, and/or different components than those depicted in FIGS. 2 and 3. In still other implementations, one or more components of devices 200/120 may perform one or more other tasks described as being performed by one or more other components of devices 200/120.

Figure 4:
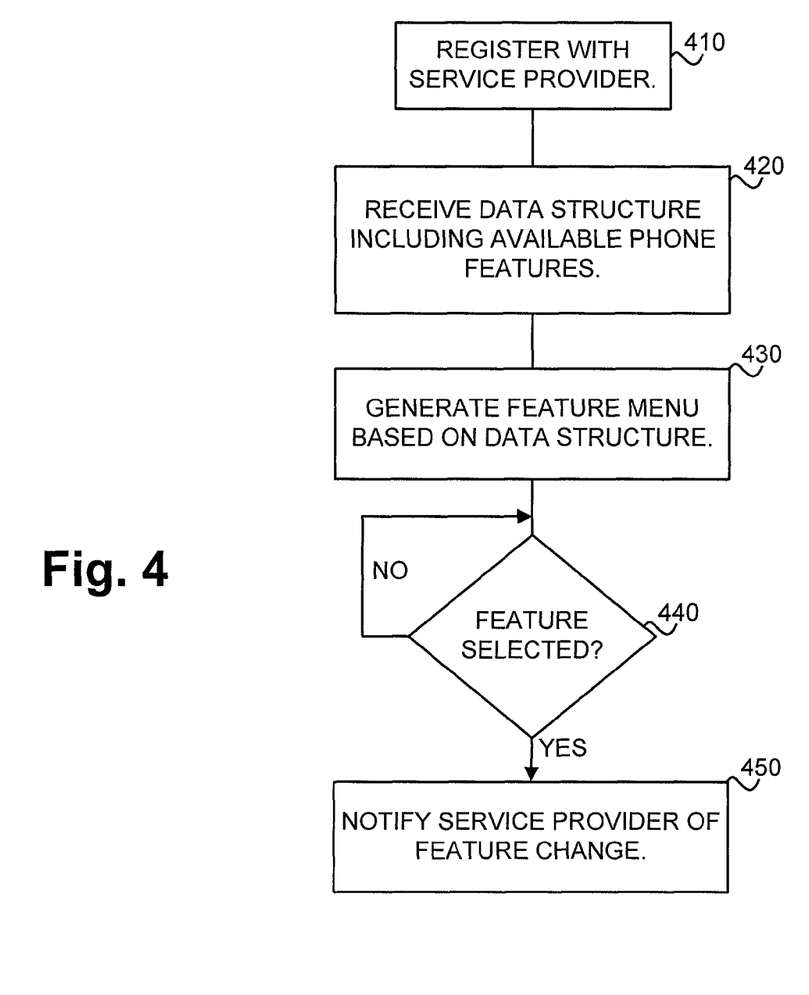
FIG. 4 is a flow chart of an exemplary process for selecting or modifying a phone feature via the phone devices shown in FIG. 1.

FIG. 4 is a flow chart of an exemplary process for selecting or modifying a phone feature via phone device 200. The phone "features," as used herein, may refer to any option or service associated with the telephone account of the user and in which the service provider or telephone vendor enables user customization. The features may include, for example, features traditionally modified via star codes, such as call waiting, call forwarding, etc.

In the description that follows, phone device 200 may be a device designed to use the SIP (Session Initiation Protocol) or other substantially real-time, packet-based, communications protocol to create, modify, and terminate voice sessions. Phone device 200 may thus be a SIP user agent and may use VoIP services provided by a VoIP provider. In other implementations, phone device 200 may use a protocol other than SIP to provide functions for session initiation and termination.

Initially, phone device 200 may register with the VoIP provider that is providing the VoIP services to phone device 200 (block 410). LAN 130 may be, for example, a proprietary corporate network that may subscribe to VoIP services from the service provider. Devices in LAN 130, such as phone device 200, when registering with the service provider, may provide identification/credential information to identify phone device 200 as being a device authorized to receive services from the service provider. The registration may be performed, for example, when the device is first powered up, when the device changes network addresses, or at other times when the device needs to inform the service provider of its address and/or availability.

Phone device 200 may receive a data structure from the VoIP provider (or from another entity) that defines the available features for the service plan with which the user is subscribed (block 420). For each feature, the data structure may include the pertinent data for that feature, such as whether the feature is enabled or disabled, and any configuration data (e.g., a forwarding telephone number) for that feature.

Figure 5:
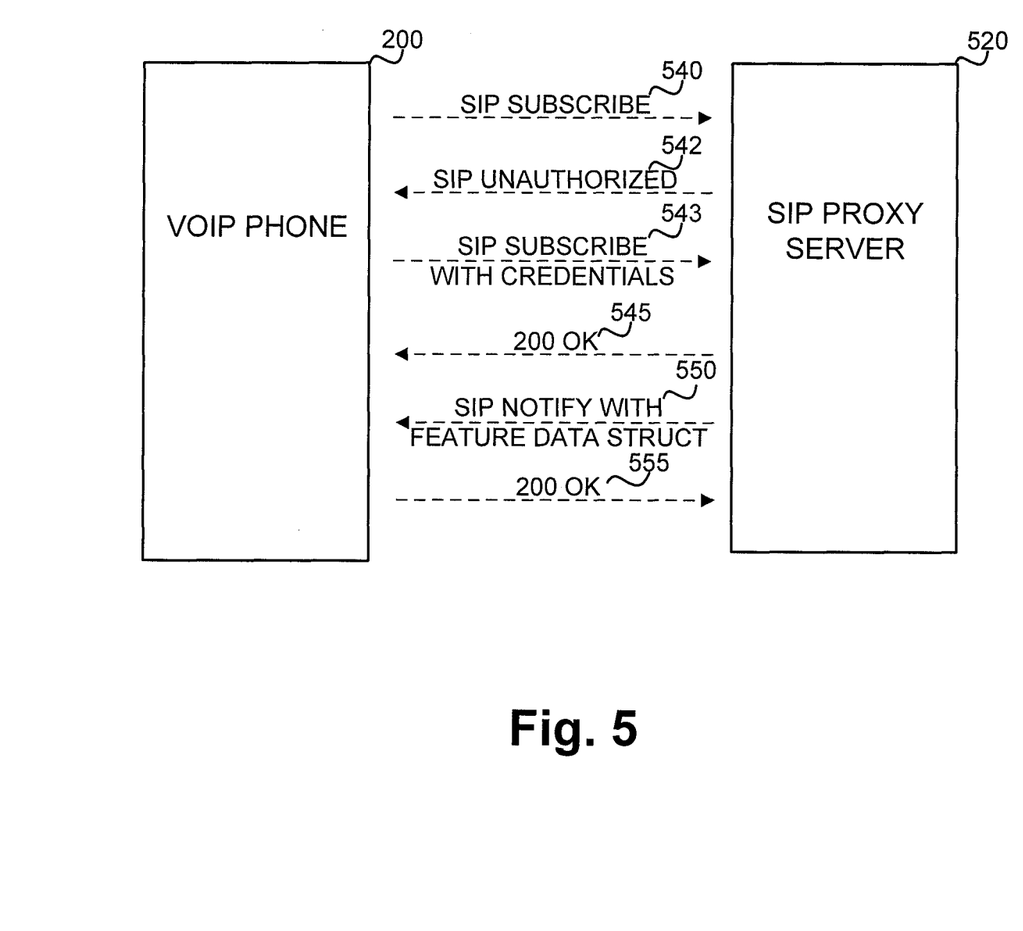
FIG. 5 is an exemplary messaging diagram illustrating certain blocks shown in FIG. 4 in additional detail.

FIG. 5 is an exemplary messaging diagram illustrating block 420 in additional detail. In this example, assume phone device 200 is a VoIP device, such as wired VoIP phone 155 or wireless VoIP phone 160, that initiates voice sessions using SIP. Further, assume that phone device 200 registers with a SIP proxy server 520. Proxy server 520 may be controlled by the VoIP service provider or by a separate proxy vendor associated with the VoIP provider. In the context of the system shown in FIG. 1, proxy server 520 may be, for example, a server such as server device 120.

At some point after phone device 200 registers with proxy server 520, phone device 200 may send a SIP SUBSCRIBE message 540 that indicates that phone device 520 would like to subscribe to the features offered by the service provider. Proxy server 520 may respond with, for example, a SIP UNAUTHORIZED message 542, or another message, that indicates that phone device 200 should send credentials to authenticate itself. In response, phone device 200 may respond with a SIP SUBSCRIBE message 543 that includes the credentials such as identification and authentication information associated with phone device 200. If proxy server 520 accepts the credentials of phone device 200, it may respond with a SIP OK message 545 (i.e., a "SIP 200" response).

Proxy server 520 may additionally send a SIP NOTIFY message 550. The NOTIFY message may include a data structure defining the available phone features. For example, the data structure may be an extensible markup language (XML) description that is transmitted using the known session description protocol (SDP). The data structure may, for example, be embedded in the SDP proxy specific section of NOTIFY message 550. SDP is a protocol generally used for describing voice or multimedia sessions. In alternative implementations, a protocol or technique other than SDP may be used to communicate the data structure to phone device 200.

Phone device 200 may respond to SIP NOTIFY message 550 with a SIP OK message 555, indicating that message 545 was received.

Figure 6:
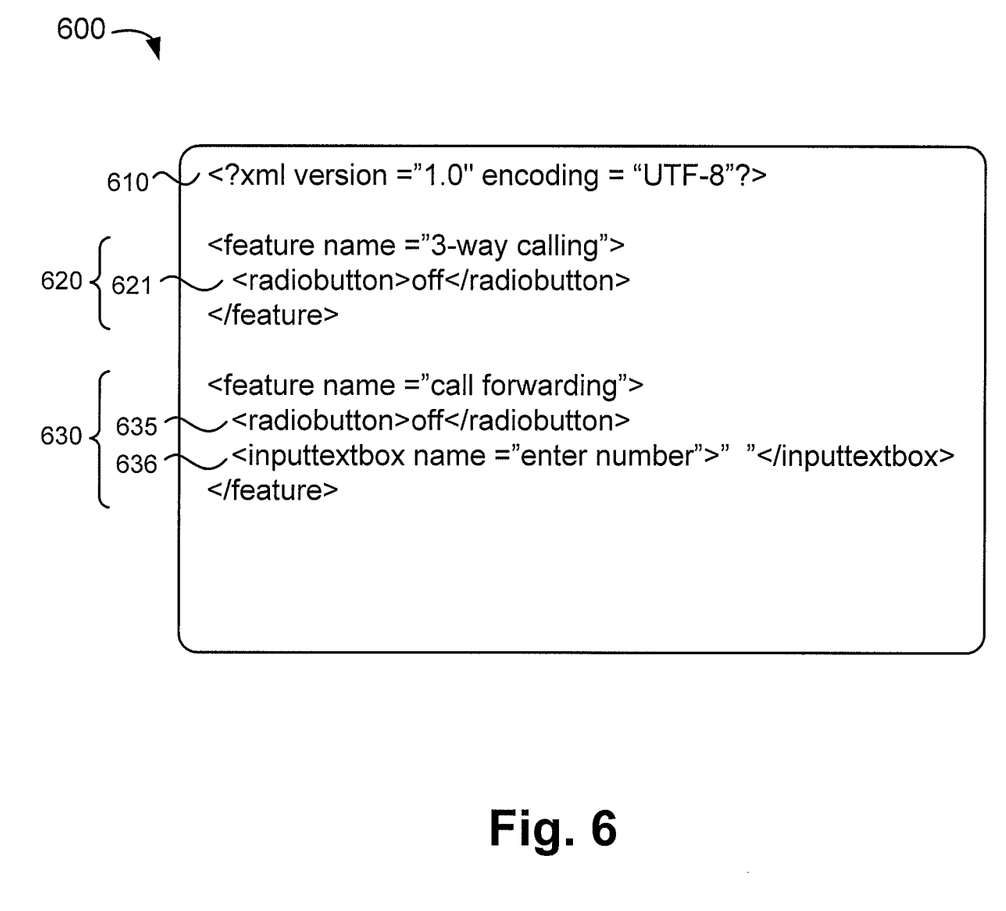
FIG. 6 is a diagram illustrating an exemplary data structure sent by a proxy server to a phone device.

FIG. 6 is a diagram illustrating an exemplary data structure 600 sent by proxy server 520 to phone device 200, such as the data structure sent with message 550 in FIG. 5. As mentioned, data structure 600 may be sent as part of the SDP portion of a SIP NOTIFY message. In one implementation, data structure 600 may be a data structure that includes or is implemented as an extensible markup language (XML) document. XML is a language designed to facilitate the sharing of structured data across different information systems. Data structure 600 may include other non-XML portions. For example, the non-XML portions of data structure 600 may be necessary to integrate the data structure in the SDP portion of the SIP NOTIFY message.

As shown, exemplary data structure 600 includes an XML header 610 and two XML "feature" tags 620 and 630. Each tag 620 and 630 may specify a particular menu option that should be presented by phone device 200 when the user chooses to view phone features provided by the service provider. Tag 620, for example, may describe the feature "3-way calling." As shown, tag 620 may include a sub-tag 621, which may indicate that the feature "3-way calling" is to be presented to the user as a "radio button" graphical element that has a default value of "off." Similarly, tag 630 may describe the feature "call forwarding." Tag 630 may include a first sub-tag 635, which may indicate that the call forwarding feature is to be presented to the user as a "radio button" (which the user uses to select whether to enable/disable call forwarding). Tag 630 may additionally include a second sub-tag 636, which may indicate that a text box is to be displayed to the user to allow the user to enter a number appropriate for call forwarding.

Referring back to FIG. 4, phone device 200 may generate a feature menu based on data structure 600 (block 430). The menu may provide options relating to services available to the user of the phone. Phone device 200 may generate the menu by parsing data structure 600 to obtain the available menu options. The semantic format for the XML in data structure 600 may be agreed upon in advance by the entity controlling proxy server 520 and the vendor of phone device 200 (e.g., the phone manufacturer). In data structure 600, for instance, tag 630 may indicate that a feature "call forwarding" should be offered and this feature should include an option to allow the user to turn the feature on or off (tag 635) and an option to enter the number for which call forwarding is applicable (tag 636).

Figure 7:
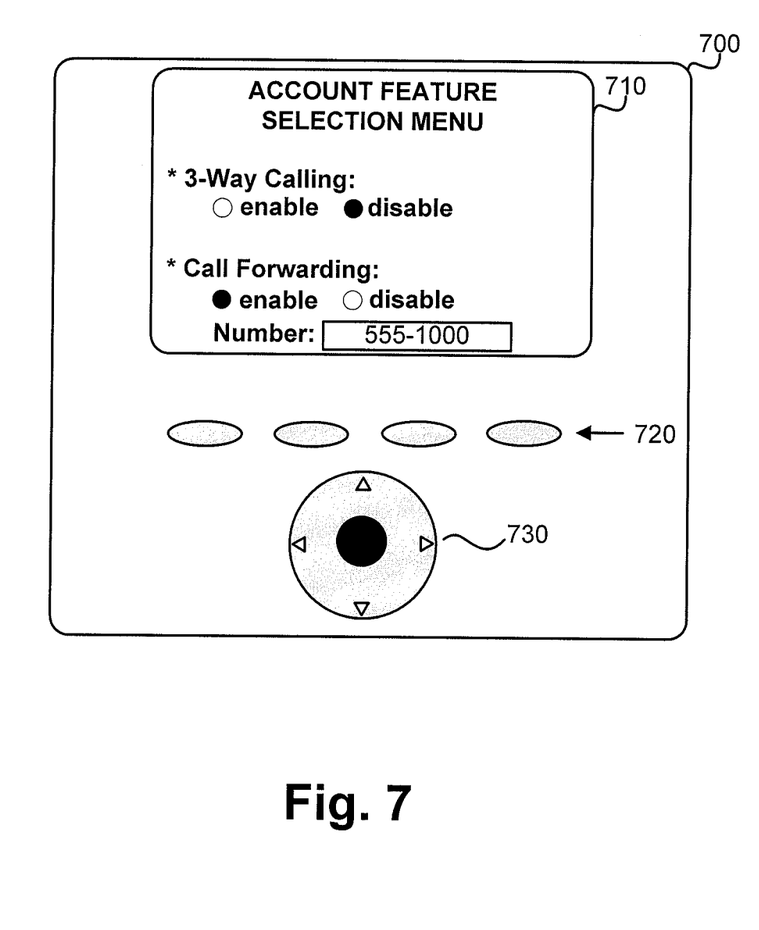
FIG. 7 is a diagram of an exemplary interface of a phone device showing an exemplary feature menu.

FIG. 7 is a diagram of an exemplary interface 700 of phone device 200 showing an exemplary feature menu 710. As shown, interface 700 may include a feature menu 710, buttons 720, and a control wheel 730. In this example, assume feature menu 710 is presented in display 230 of phone device 200 and buttons 720 and control wheel 730 are part of keypad 270 of phone device 200. In an alternative implementation, buttons 720 and control wheel 730 may be soft buttons that are embodied in a touch screen display 230 and that allow a user to select various menu options. It can be appreciated that the particular layout of interface 700 is purely exemplary; other layouts, buttons, or input elements could be used.

In FIG. 7, feature menu 710 is shown as displaying the two menu options described in data structure 600. That is, feature menu 710 provides a menu option for 2-way calling, in which the user may select that 3-way calling is enabled or disabled. Additionally, feature menu 710 provides a menu option to enable or disable call forwarding as well as a section to input a number for which calls are to be forwarded.

Referring back to FIG. 4, at some point a user may navigate to the feature menu, such as feature menu 710, and make a selection (block 440—YES). For example, the user may press a button or navigate to a certain graphical element in phone device 200 that presents the feature menu 710. In one implementation, for security reasons, the feature menu may be password protected. In other words, it may only be shown to the user after the user authenticates himself using a password.

When a user's selection of feature menu 710 modifies a feature, phone device 200 may notify the service provider of the changed feature (block 450). This notification can be performed by phone device 200 sending a message to the service provider. For example, in one implementation, a SIP NOTIFY message may be used to notify the service provider of the changed feature.

Figure 8:
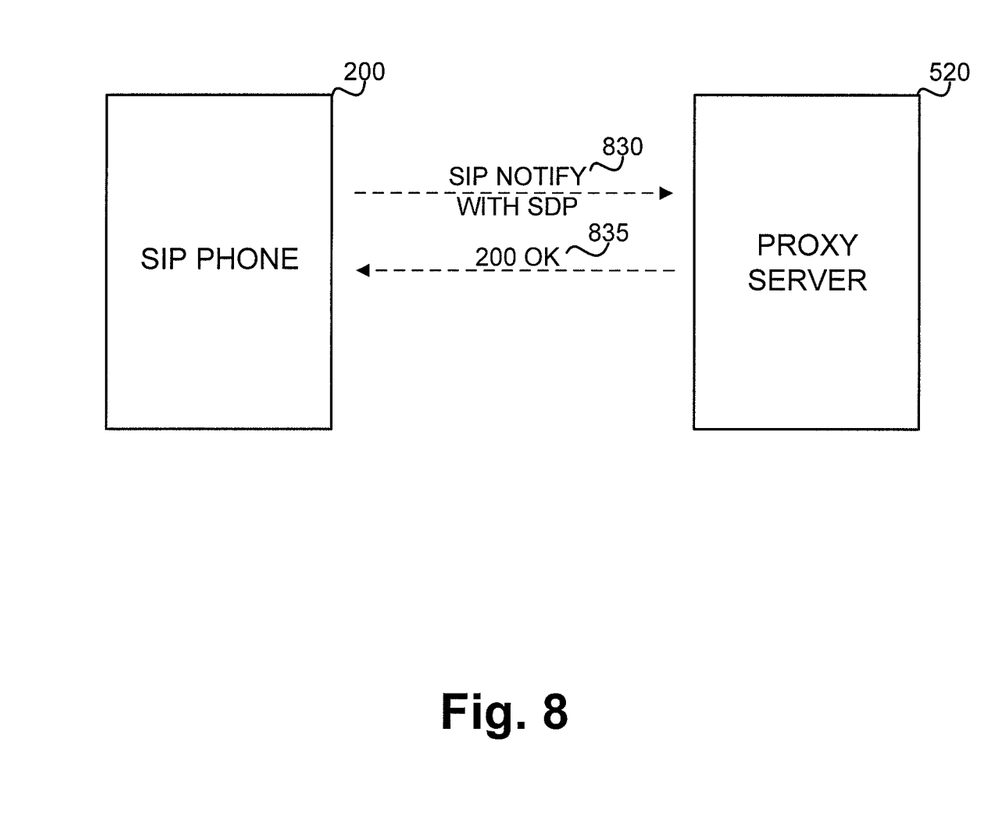
FIG. 8 is an exemplary messaging diagram illustrating notification of a service provider of a changed feature.

FIG. 8 is an exemplary messaging diagram illustrating notification of the service provider of a changed feature. As with the example shown in FIG. 5, assume phone device 200 is a VoIP device, such as wired VoIP phone 155 or wireless VoIP phone 160, that initiates voice sessions using SIP with SIP proxy server 520. Phone device 200 may transmit a SIP NOTIFY message 830 to proxy server 520. The NOTIFY message may include information defining the feature change. For example, the information can be sent as an XML document that is transmitted using SDP. The XML document may, for example, be embedded in the SDP proxy specific section (or in another section) of NOTIFY message 830.

Proxy server 520, after successfully receiving SIP NOTIFY message 830, may respond with a SIP OK message 835, indicating that SIP NOTIFY message 830 was successfully received. Based on the feature change in SIP NOTIFY message 830, proxy server 520 may appropriately change the configuration setting(s) of the account associated with the user of phone device 200. For example, SIP NOTIFY message 830 may indicate that the user wishes to disable call forwarding. Proxy server 520 (or another entity that participates in the VoIP service), may accordingly disable call forwarding.

In certain situations, it may be desirable for the service provider to proactively initiate updating of phone device 200 to reflect updated feature configurations. For example, the service provider may change the available menu options (e.g., a new feature configuration setting may be added). Alternatively, the feature settings in the user's account may be modified by the service provider or the feature settings may be changed by the user via a different method. For example, the service provider may provide a web interface as an alternative way for user's to change account feature settings. Still further, the user may update an account feature by dialing traditional star codes.

Figure 9:
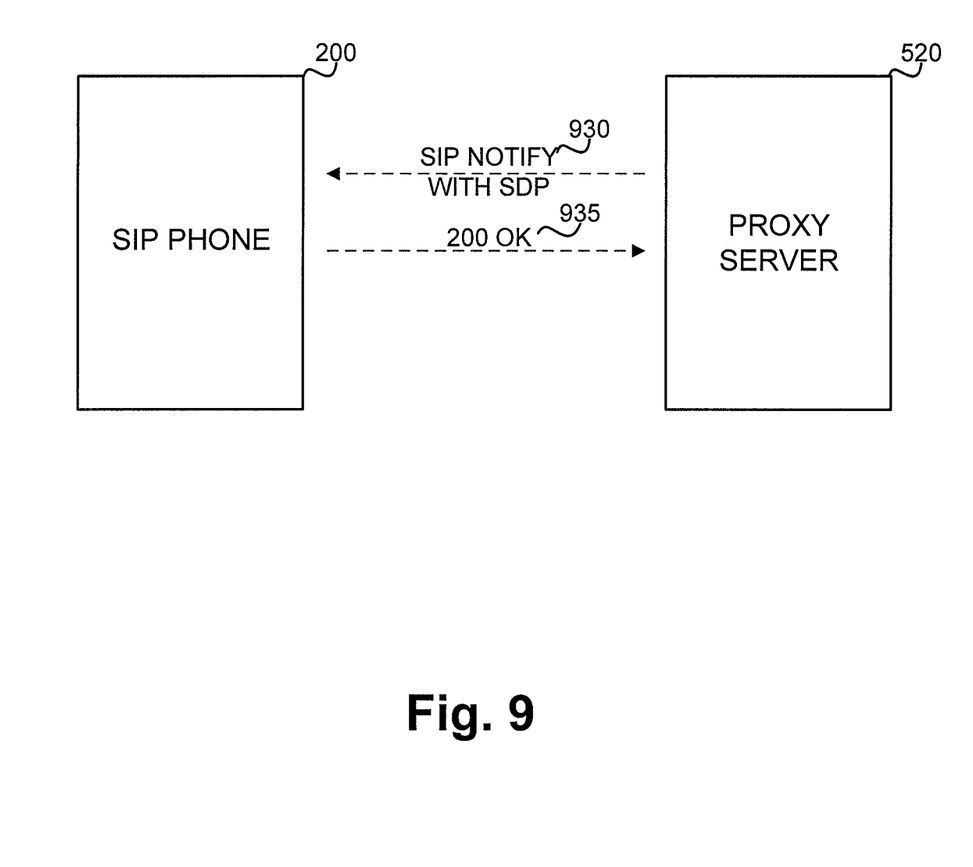
FIG. 9 is an exemplary messaging diagram illustrating notification of a phone device by a service provider of a changed feature.

FIG. 9 is an exemplary messaging diagram illustrating notification of phone device 200 by the service provider of a changed feature. As with the example shown in FIGS. 6 and 7, assume phone device 200 is a VoIP device, such as wired VoIP phone 155 or wireless VoIP phone 160, that initiates voice sessions using SIP with SIP proxy server 520. Proxy server 520 may transmit a SIP NOTIFY message 930 to phone device 200. The NOTIFY message may include information defining the menu change or feature setting change. For example, the information can be sent as an XML document that is transmitted using SDP. The XML document may, for example, be embedded in the SDP proxy specific section of NOTIFY message 930.

Phone device 200, after successfully receiving SIP NOTIFY message 930, may respond with a SIP OK message 935, indicating that SIP NOTIFY message 930 was successfully received. Based on the feature change in SIP NOTIFY message 930, phone device 200 may appropriately update the data used to render feature menu 710.

The ability to dynamically update a menu describing features relating to the VoIP account of a user may be particularly useful as it provides a graphical menu through which users can see available options and make selections. Further, updates or changes to the available menu options can be dynamically sent to the phone device.

While the discussion above primarily refers to a device receiving and transmitting feature changes from a "service provider," it can be appreciated that the feature changes can be exchanged with other entities, such as a proxy vendor.

The foregoing description of implementations provides illustration, but is not intended to be exhaustive or to limit the implementations to the precise form disclosed. Modifications and variations are possible in light of the above teachings or may be acquired from practice of the teachings.

In addition, while a series of blocks have been described with regard to processes illustrated in FIG. 4 and the messaging diagrams illustrated in FIGS. 5, 8, and 9, the order of the blocks and/or messages may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

What is claimed is:

1. A method comprising:
   transmitting, by a user telephone device, a first message to another device,
      the first message including authentication information associated with the user telephone device and being associated with a subscription, and
      the other device being different than the user telephone device;
   receiving, by the user telephone device and from the other device, a second message indicating that the user telephone device is authenticated and may receive information associated with the subscription,
      the second message being based on the transmitted first message;
   receiving, by the user telephone device, a third message including a data structure,
      the data structure including a plurality of extensible markup language (XML) tags,
         each of the plurality of XML tags defining a different telephone communication feature relating to a telephone service, associated with the subscription, for the user telephone device, and
      the data structure being embedded in a session description protocol section of the third message;
   parsing, by the user telephone device, the data structure to generate a menu including each telephone communication feature defined by each of the plurality of XML tags;
   providing, by the user telephone device and for presentation, the menu;
   receiving, by the user telephone device, a selection of a telephone communication feature associated with the menu;
   modifying, by the user telephone device and based on receiving the selection of the telephone communication feature, a functionality associated with the telephone communication feature; and
   transmitting, by the user telephone device and based on modifying the functionality associated with the telephone communication feature, a fourth message to the other device,
      the fourth message including information that notifies the other device of the modification to the functionality associated with the telephone communication feature.

2. The method of claim 1, where, when transmitting the fourth message to the other device, the method includes:
   transmitting the fourth message to the other device as part of a session initiation protocol (SIP) message.

3. The method of claim 2, where the SIP message is a SIP notify message.

4. The method of claim 1, where the data structure is defined as an XML document.

5. The method of claim 1, where the data structure is received as part of a session initiation protocol (SIP) message.

6. The method of claim 1, where the user telephone device is a Voice over IP (VoIP) phone device.

7. The method of claim 1, where the data structure is received via session description protocol (SDP) in a session initiation protocol (SIP) message.

8. The method of claim 1, further comprising:
prompting a user of the user telephone device to enter a password; and
providing, for display, the menu to the user when the password entered by the user matches a stored password.

9. A method comprising:
receiving, by a device and from a user telephone device, a first message,
the first message including authentication information associated with the user telephone device and being associated with a subscription, and
the device being different than the user telephone device;
transmitting, by the device and to the user telephone device, a second message indicating that the user telephone device is authenticated and may receive information associated with the subscription,
the second message being based on the received first message;
transmitting, by the device and to the user telephone device, a third message including a data structure,
the data structure including a plurality of extensible markup language (XML) tags,
each of the plurality of XML tags defining a different telephone communication feature, of telephone communication features, relating to a telephone service, associated with the subscription, provided for an account associated with the user telephone device, and
the data structure being embedded in a session description protocol section of the third message;
receiving, by the device, a fourth message from the user telephone device based on a selection of a menu item relating to one or more of the telephone communication features,
the selection of the menu item causing a modification of a functionality associated with the one or more of the telephone communication features, and
the fourth message including information that notifies the device of the modification to the functionality associated with the one or more of the telephone communication features; and
changing, based on receiving the fourth message and based on the selected menu item, at least one configuration setting of an account associated with the user telephone device.

10. The method of claim 9, further comprising:
receiving a registration message from the user telephone device when the user telephone device initially attempts to connect to the telephone service provided for the account associated with the user telephone device.

11. The method of claim 9, where the data structure is defined as an XML document.

12. The method of claim 9, where the data structure is received as part of a session initiation protocol (SIP) message.

13. The method of claim 9, where the one or more of the telephone communication features include at least one of call waiting or call forwarding.

14. The method of claim 9, where the user telephone device is a Voice over IP (VoIP) phone device.

15. A telephone device comprising:
a memory to store a plurality of instructions; and
a processor to execute plurality of instructions in the memory to:
transmit a first message to another device,
the first message including authentication information associated with the telephone device and being associated with a subscription, and
the other device being different than the telephone device;
receive, from the other device, a second message indicating that the telephone device is authenticated and may receive information associated with the subscription,
the second message being based on the transmitted first message;
receive a third message including a data structure,
the data structure including a plurality of extensible markup language (XML) tags,
each of the plurality of XML tags defining a different telephone communication feature relating to a telephone service, associated with the subscription, for the telephone device, and
the data structure being embedded in a session description protocol section of the third message;
parse the data structure to obtain a menu including each telephone communication feature defined by each of the plurality of XML tags;
provide, for presentation, the menu;
receive a selection of a telephone communication feature associated with the menu;
modify, based on receiving the selection of the telephone communication feature, a functionality associated with the telephone communication feature; and
transmit, based on modifying the functionality associated with the telephone communication feature, a fourth message to the other device,
the fourth message including information that notifies the other device of the modification to the functionality associated with the telephone communication feature.

16. The telephone device of claim 15, where the data structure is received as part of a session initiation protocol (SIP) message.

17. The telephone device of claim 15, where the data structure is defined as an XML document.

18. A device comprising:
a memory to store a plurality of instructions; and
a processor to execute instructions in the memory to:
receive, from a user telephone device, a first message,
the first message including authentication information associated with the user telephone device and being associated with a subscription, and
the device being different than the user telephone device;
transmit, to the user telephone device, a second message indicating that the user telephone device is authenticated and may receive information associated with the subscription,
the second message being based on the received first message;

transmit, to the user telephone device, a third message including a data structure,
the data structure including a plurality of extensible markup language (XML) tags,
each of the plurality of XML tags defining a different telephone communication feature, of telephone communication features, relating to a telephone service, associated with the subscription, associated with the user telephone device, and
the data structure being embedded in a session description protocol section of the third message;
receive a fourth message from the user telephone device based on a selection of a menu item relating to one or more of the telephone communication features,
the selection of the menu item causing a modification of a functionality associated with the one or more of the telephone communication features, and
the fourth message including information that notifies the device of the modification to the functionality associated with the one or more of the telephone communication features; and
change, based on receiving the fourth message and based on the selected menu item, at least one configuration setting of an account associated with the user telephone device.

19. The device of claim 18, where the data structure is received as part of a session initiation protocol (SIP) message.

20. The device of claim 18, where the data structure is defined as an XML document.

21. The device of claim 18, where the device includes a session initiation protocol (SIP) proxy server.

22. The device of claim 18, where the processor is further to:
receive a registration message from the user telephone device when the user telephone device initially attempts to connect to the telephone service provided for the user telephone device.

23. The device of claim 18, where the one or more of the telephone communication features include at least one of call waiting or call forwarding.

* * * * *